Jan. 22, 1946.  E. R. BENNETT  2,393,279
GAP CLOSER FOR IRRIGATION RIDGES
Filed Aug. 25, 1944  3 Sheets-Sheet 1

Inventor
E. R. Bennett

Jan. 22, 1946.   E. R. BENNETT   2,393,279
GAP CLOSER FOR IRRIGATION RIDGES
Filed Aug. 25, 1944   3 Sheets-Sheet 2

Inventor
E. R. Bennett

Patented Jan. 22, 1946

2,393,279

UNITED STATES PATENT OFFICE 2,393,279

GAP CLOSER FOR IRRIGATION RIDGES

Elbert R. Bennett, Delhi, Calif.

Application August 25, 1944, Serial No. 551,211

3 Claims. (Cl. 37—180)

This invention relates to agricultural implements, and particularly to a gap closer for irrigation ridges and checks, for closing the depressions or gaps made by the wheels of a tractor and ridger implement passing over the ridges.

The major object of my invention is to provide a device for the purpose adapted to be mounted on a tractor or implement at its rear end and having one or more sets of gap closing blades whose functioning is readily controlled by the operator of the tractor or implement.

Another object is to mount the blades so that while they are ordinarily released by the operator for rearward movement clear of the dirt previously scraped up by the blades, they will yield of themselves in the event that they strike an obstruction which would otherwise damage them.

The gap closing device includes a pair of blade units spaced apart to correspond to the spacing of the gap made by the ridger; and another object is to mount these blade sets so that one set or both may be selectively brought into operation or released, as may be desired.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
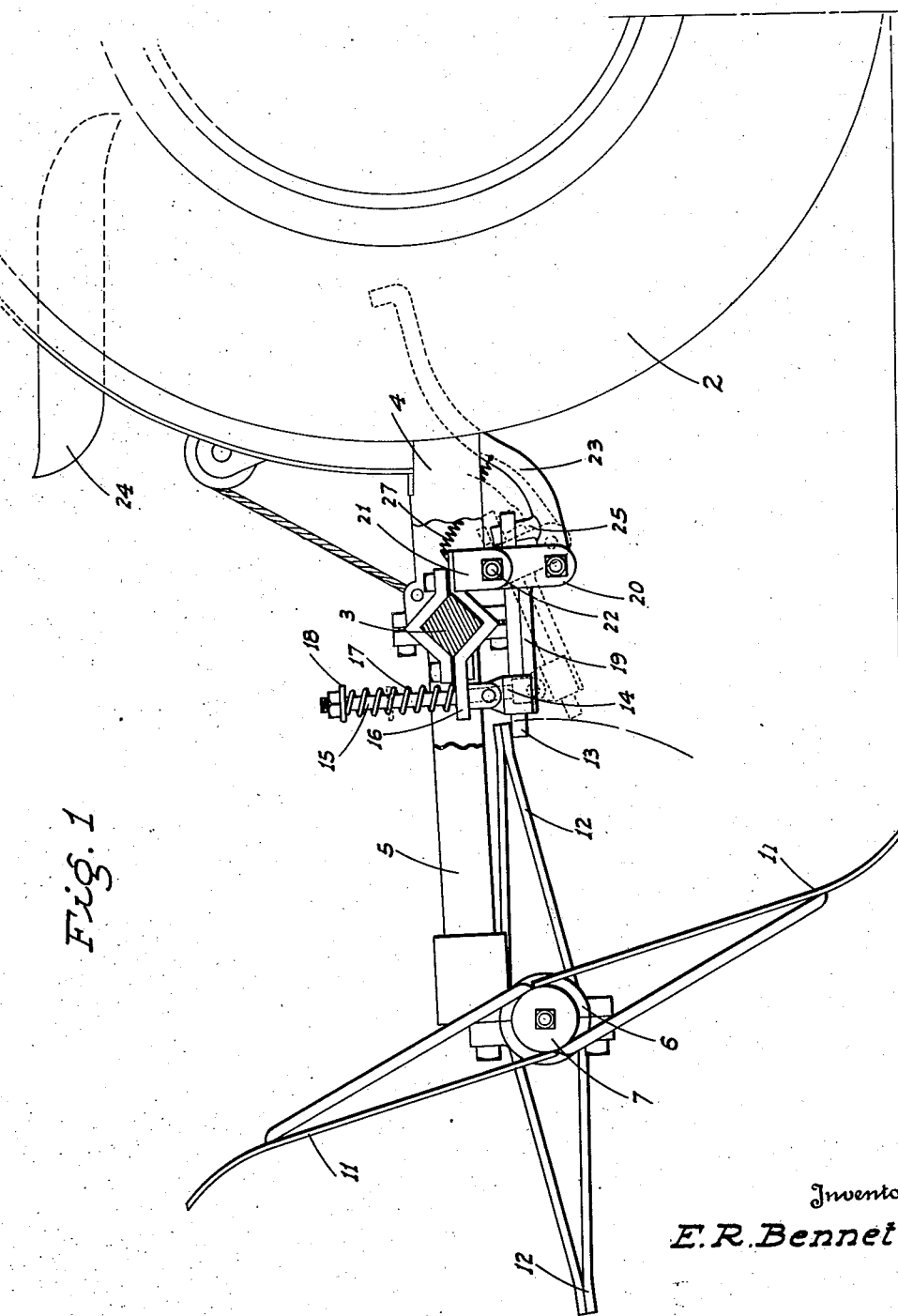
Figure 1 is a side elevation of my improved gap closer as mounted on a tractor.
Figure 2:
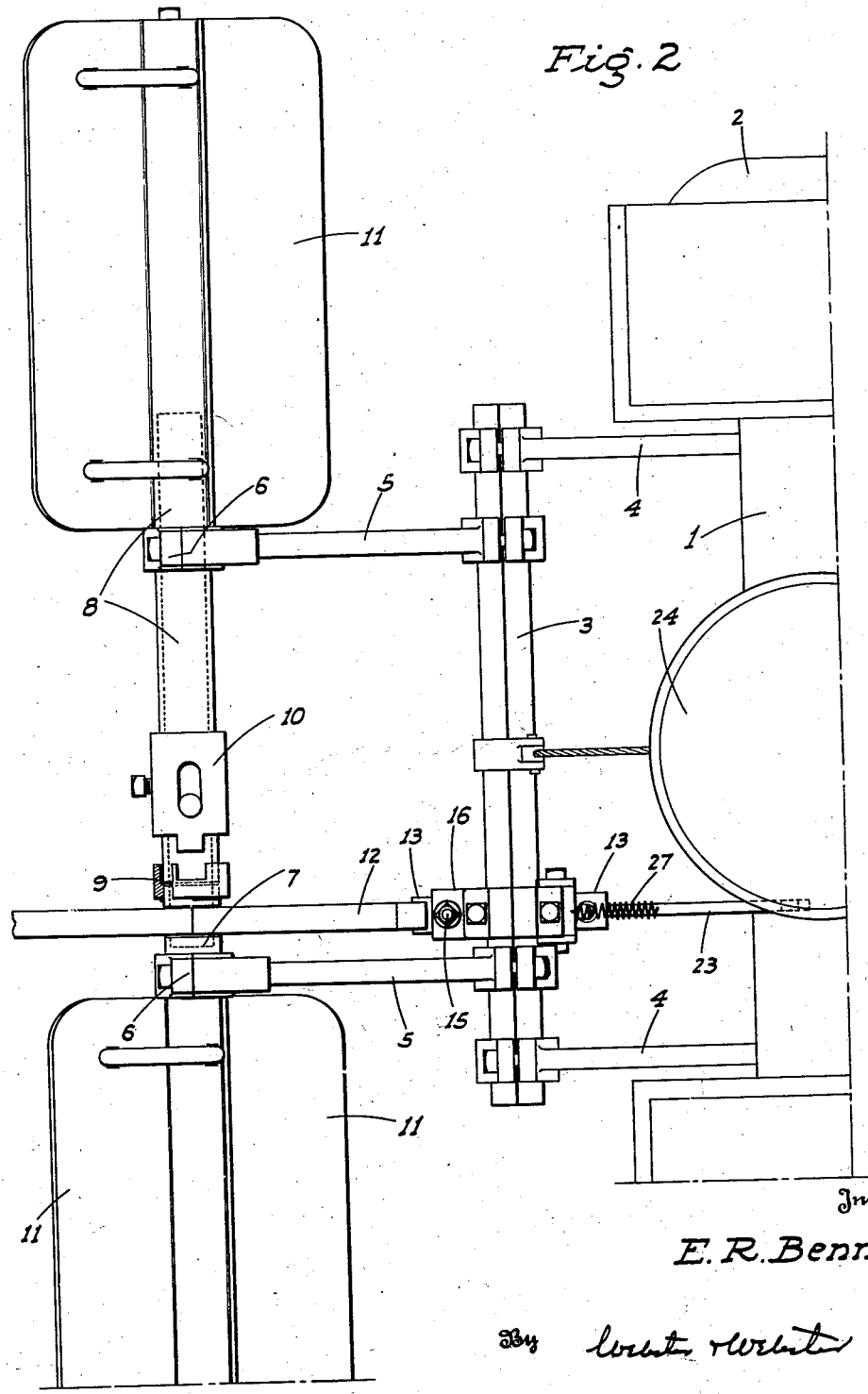
Figure 2 is a top plan view of the same.
Figure 3:
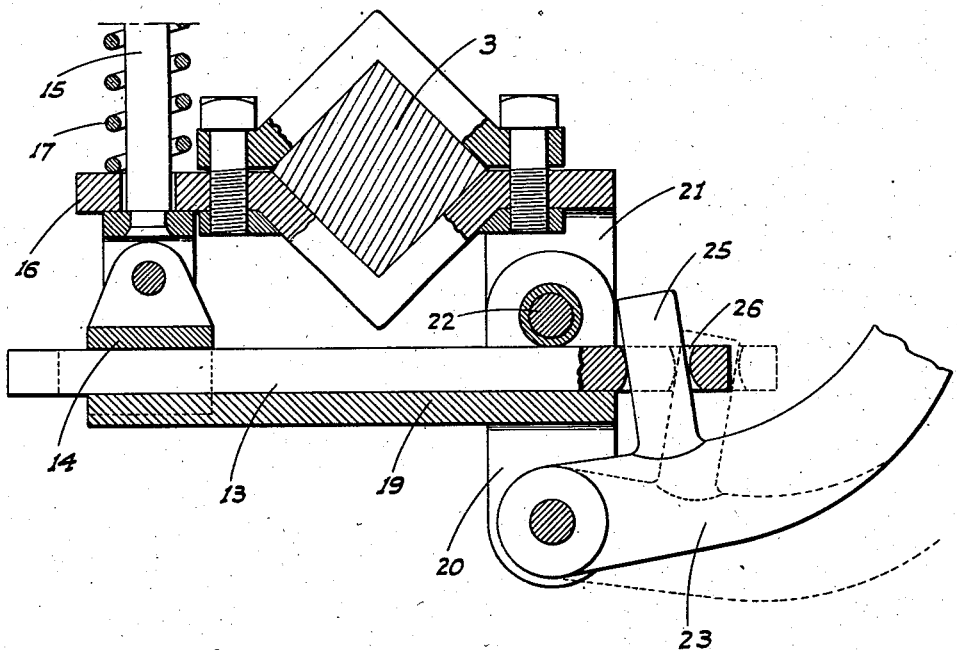
Figure 3 is an enlarged fragmentary sectional elevation of the latch and trip mechanism.

Referring now more particularly to the characters of reference on the drawings, and particularly at present to Figs. 1 to 3, the tractor 1 includes rear wheels 2 and a cross bar 3 rearwardly of the wheels and connected to the tractor by draft arms 4 adapted to be raised and lowered to control the level of the bar.

The gap closer is detachably mounted on the bar 3, and comprises a pair of draft arms 5 secured on and projecting rearwardly from the bar and having journal boxes 6 at their rear end turnably supporting relatively turnable separate shafts 7 and 8. The shaft 7 laterally inward of the corresponding arm and journal box has a clutch element 9 fixed thereon and adapted to be releasably engaged with a cooperating clutch 10 slidably but non-turnably mounted on the shaft 8.

Laterally out from the arms 5 the shafts 7 and 8 each carries a blade unit comprising a pair of opposed substantially radial blades 11 wider than and in the path of the wheels 2, and adapted to engage the ground when depending at a slight forward angle, as shown in Fig. 1.

Rigid with the shaft 7 between the adjacent arm 5 and the clutch element 9 are opposed catch arms 12, one for each blade, extending substantially at right angles to the blades. Each arm, when the corresponding blade is in a ground engaging position, projects forwardly and is then adapted to rest at its forward end on a latch or holding tongue 13. This tongue adjacent its rear end is slidably supported in a guide 14 hung from an upstanding stem 15 slidable through a supporting plate 16 clamped on the bar 3. A heavy compression spring 17 is disposed about the stem between the plate and an adjustable collar 18 on the upper end of the stem.

The guide 14 is rigid with a forwardly projecting bar or plate 19, which at its forward end is rigid with depending links 20 pivoted above the bar on ears 21 depending from the plate 16. The tongue extends lengthwise of the tractor and is slidably supported on the bar 19 and projects ahead of the links 20 somewhat, being guided adjacent its forward end between said bar 19 and the link pivot bolt 22 thereabove.

The trip mechanism for the latch tongue comprises a foot lever 23 pivoted between the links 20 below the bar 19 and extending forwardly to a position convenient for pressure by a foot of the operator occupying the seat 24 on the tractor. An upstanding lug 25 on the lever projects through an opening 26 in the tongue just ahead of the links. A spring 27 between the lever and plate 16 acts to pull the lever up and thus maintain the tongue in its rearward position. By reason of the above described arrangement it will be seen that if the clutch elements are disconnected only that blade unit which is rigid with the catch arms will be under control, the other unit merely hanging free.

When any blade is in ground engaging position and the corresponding catch arm is engaged with the tongue 13, dirt will be piled up by the blade to close the gap in the check or ridge left by the passage of the corresponding ridger implement. When it is desired to trip the blade so as to leave this piled-up dirt in place it is only necessary for the operator to depress the lever 23. This withdraws the tongue from the arm 12, allowing the blade 11 to swing free and rotate until the other blade and the other arm 12 are in operative position. As soon as the lever 23 is released the tongue will return to its normal position to engage said other arm, if it is desired to do so.

When a blade is in ground engagement, the backward tendency to rotation of the blade imparts a downward pressure on the arm 12. Ordinarily the spring 17 resists such downward pressure but if the blade strikes a relatively nonyielding obstruction the spring is overcome. The tongue and its supporting structure, including the links 20, then swing down as a unit about the bolt 22 as an axis, as indicated in Fig. 1, until the catch arm 12 passes by the tongue. The blade can thus swing clear of an obstruction without damage and without any manipulation of the trip mechanism by the operator, who may be initially unaware of the presence of such obstruction.

Although I show the catch arm unit as applied to the right-hand blade unit only, it may be mounted in connection with the left-hand blade unit if desired.

Figure 4:
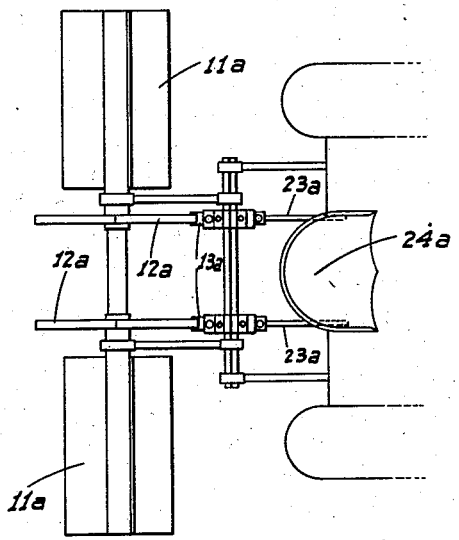
Figure 4 is a diagrammatic plan showing a modified mount and control of the blade units.

Also, as shown in Fig. 4, each blade unit 11a may have its own catch arm unit 12a and a corresponding latch and trip mechanism including a latch tongue 13 and a foot lever 23a, the levers being disposed on opposite sides of the seat 24a. Though here described as being mounted on a tractor, the device may also be mounted directly on the ridger implement or other vehicle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A gap closer for use on a vehicle having ground engaging members comprising, with a mounting bar at the rear end of the tractor, a transverse shaft rearwardly of the bar, means turnably supporting the shaft from the bar, a blade to engage the ground fixed on the shaft in the path of the vehicle member, a holding arm fixed on and projecting forwardly from the shaft when the blade is in ground engaging position, a latch tongue on the rear end of which the arm rests when the blade is in said ground engaging position, the tongue extending lengthwise of the vehicle, guide means engaging the tongue for longitudinal sliding movement, manual means to slide the tongue, means pivoting the guide means on the bar for downward movement at the rear end, and spring means resisting such downward movement of the guide means.

2. A device as in claim 1 in which said manual means includes a forwardly projecting foot lever pivoted on the guide means adjacent its forward end and below the tongue.

3. A gap closer for use on a vehicle having ground engaging members comprising, with a mounting bar at the rear end of the vehicle, alined transverse shafts rearwardly of the bar, means supporting the shafts from the bar for independent rotation, blades to engage the ground fixed on the shafts in the paths of the corresponding vehicle members, selectively operable means to control the functioning of one blade, and releasable connection means between the shafts.

ELBERT R. BENNETT.